United States Patent
Debordeaux et al.

(10) Patent No.: US 11,633,991 B2
(45) Date of Patent: Apr. 25, 2023

(54) TIRE PROVIDED WITH A TEXTURE ON A SIDEWALL

(71) Applicant: COMPAGNIE GENERALE DES ETABLISSEMENTS MICHELIN, Clermont-Ferrand (FR)

(72) Inventors: Héloïse Debordeaux, Clermont-Ferrand (FR); Olivier Muhlhoff, Clermont-Ferrand (FR); Masayoshi Nomura, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 306 days.

(21) Appl. No.: 16/491,334

(22) PCT Filed: Mar. 1, 2018

(86) PCT No.: PCT/EP2018/055005
§ 371 (c)(1),
(2) Date: Sep. 5, 2019

(87) PCT Pub. No.: WO2018/162308
PCT Pub. Date: Sep. 13, 2018

(65) Prior Publication Data
US 2020/0070591 A1    Mar. 5, 2020

(30) Foreign Application Priority Data

Mar. 6, 2017  (FR) .................................. 1751786

(51) Int. Cl.
*B60C 13/02* (2006.01)
*B60C 13/00* (2006.01)
*B60C 1/00* (2006.01)

(52) U.S. Cl.
CPC .......... *B60C 13/001* (2013.01); *B60C 1/0025* (2013.01)

(58) Field of Classification Search
CPC ..... B60C 13/00; B60C 13/001; B60C 13/002; B60C 13/02; B60C 13/023
See application file for complete search history.

(56) References Cited

U.S. PATENT DOCUMENTS

| | | | |
|---|---|---|---|
| 2004/0187997 A1* | 9/2004 | Paturle | B60C 13/001 264/293 |
| 2008/0066846 A1 | 3/2008 | Metz | |
| 2013/0032265 A1 | 2/2013 | Kouda et al. | |

FOREIGN PATENT DOCUMENTS

| | | |
|---|---|---|
| DE | 102012104890 | * 12/2013 |
| FR | 3 022 851 | 1/2016 |

(Continued)

OTHER PUBLICATIONS

Machine translation of JP 09315111, 1997.*
Machine translation of DE 102012104890, 2013.*

*Primary Examiner* — Justin R Fischer
(74) *Attorney, Agent, or Firm* — Cozen O'Connor

(57) ABSTRACT

A tire made of rubbery material comprises tread (12) and two sidewalls (14) delimiting the tread, at least one of the sidewalls comprising at least one texture (16) that contrasts with the rest of the sidewall. The texture is divided into a plurality of adjacent patterns (18, 20) of identical external shape. All or some of the patterns comprise a plurality of texture elements arranged to form in the pattern a plurality of rows that extend in the same direction of extension. For a given pattern of the texture, the rows of texture elements in each pattern adjacent to the given pattern have a direction of extension different from the direction of extension of the rows of texture elements of the given pattern. The lightness of the rest of the sidewall, which is not textured, is at least (Continued)

5 units greater than the lightnesses of the patterns of the texture.

18 Claims, 3 Drawing Sheets

(56) References Cited

FOREIGN PATENT DOCUMENTS

| | | | |
|---|---|---|---|
| JP | 09315111 | * | 12/1997 |
| JP | 2007 320469 | | 12/2007 |
| JP | 2011 116306 | | 6/2011 |
| JP | 2014 136487 | | 7/2014 |
| WO | WO 2016/005572 A2 | | 1/2016 |
| WO | WO 2016/067854 | | 5/2016 |

* cited by examiner

TIRE PROVIDED WITH A TEXTURE ON A SIDEWALL

RELATED APPLICATIONS

This is a U.S. National Phase Application under 35 USC 371 of International Application PCT/EP2018/055005 filed on Mar. 1, 2018.

This application claims the priority of French application no. 1751786 filed Mar. 6, 2017, the entire content of which is hereby incorporated by reference.

FIELD OF THE INVENTION

The present invention relates to the field of tires for vehicles.

More particularly, the invention relates to tires having at least one particular texture on a sidewall in order to provide an improved appearance.

BACKGROUND OF THE INVENTION

As is known, the internal carcass of the tire is made up of at least one carcass ply of threads coated in rubber. During a step of manufacturing the tire, this carcass ply is cut and then assembled on a drum. However, it is possible that, while it is being fitted, the end of the carcass ply does not coincide exactly with the start of this ply on the drum, such that there is a ply surplus in the assembly.

This overlap locally creates an overthickness in the unvulcanized green form of the tire. Once this unvulcanized green form has been vulcanized and the resultant tire inflated, this overthickness appears as a crater in the sidewall of the tire.

However, such a crater is particularly visible on the tire, notably under particular lighting conditions. This can form a reason for a consumer not to buy the tire, even though this defect has no impact whatsoever on the behaviour of the tire and is thus not detrimental to safety.

In order to conceal this defect on the side wall of the tire, the patent application US 2008/0066846 has proposed forming a moiré pattern on the sidewall of the tire, notably in the region where the distortion/cratering deformation created by the overlapping of the ends of the carcass ply or plies is located. The moiré patterns described are obtained by superposition of groups of non-identical curves. These moiré patterns are intended to create interference when the light is reflected by the sidewall of the tire. Thus, these differences in reflection of the light, which previously existed between the distortion/cratering deformation and the rest of the surface of the sidewall, are no longer visible to the naked eye.

One of the problems with this solution relates to the cost associated with obtaining these moiré patterns of complex shape. Furthermore, such patterns are not entirely satisfactory as far as the concealing of surface defects on the sidewall of the tire is concerned.

The present invention aims to remedy these drawbacks.

SUMMARY OF THE INVENTION

One object of the present invention is to improve even further the concealing of the deformation defects on the sidewalls of tires while providing these tires with a high-end appearance.

One aspect of the present invention relates to a tire made of rubbery material, comprising a tread and two sidewalls delimiting said tread, at least one of the sidewalls comprising at least one texture that contrasts with the rest of the sidewall. The texture is divided into a plurality of adjacent patterns of identical external shape. All or some of the patterns comprise a plurality of texture elements arranged so as to form in the pattern a plurality of rows that extend in one and the same direction of extension. For a given pattern of the texture, the rows of texture elements in each pattern adjacent to the given pattern have a direction of extension different from the direction of extension of the rows of texture elements of the given pattern. The lightness of the rest of the sidewall, which is not textured, is at least 5 units greater than the lightnesses of the patterns of the texture.

A "tire" means all types of resilient tread, whether or not it is subjected to an internal pressure.

A "rubbery material" means a diene elastomer, that is to say, in a known way, an elastomer which is based, at least partially (i.e. is a homopolymer or a copolymer), on diene monomers (monomers bearing two conjugated or non-conjugated carbon-carbon double bonds).

The "tread" of a tire means a quantity of rubbery material delimited by lateral surfaces and by two main surfaces, one of which, referred to as the tread surface, is intended to come into contact with a road surface when the tire is being driven on. The tread comprises a plurality of cuts extending over at least one of the lateral surfaces.

The "sidewall" of a tire means a part of the lateral surface of the tire that is disposed between the tread of the tire and a bead of this tire, starting from the ends of the cuts in the tread and extending as far as the bead.

A "texture" on a sidewall means a sidewall part that has different surface-state characteristics from the rest of the sidewall and is formed at least partially by repetition of a pattern of identical external shape.

A "pattern" means an area of the texture that comprises an organized arrangement of texture elements with one and the same orientation, i.e. the direction of extension.

"Texture elements" are understood to be elements that protrude from or are recessed into the sidewall of the tire.

"Adjacent patterns" are understood to be contiguous patterns that comprise at least one common edge. For example, all or some of the patterns of said texture may each be delimited by at least two, inner and outer edges and by at least two lateral edges. In this case, for a given pattern of said texture, at least one of the edges of each pattern adjacent to said given pattern is shared with one of the edges of said given pattern.

The "inner and outer edges" are understood to be the edges of the pattern as seen in a radial direction, i.e. a direction perpendicular to the axis of rotation of the tire. The "lateral edges" are understood to be the edges of the pattern as seen in a circumferential direction, i.e. a direction tangential to a circle centred on the axis of rotation of the tire.

By virtue of the invention, for a given pattern of the texture, patterns adjacent to said pattern are obtained that have different lightnesses given the arrangement of the texture elements of the patterns and the particular orientation of the patterns with respect to one another. The difference in lightness, perceived by an observer, between adjacent patterns varies depending on the lighting conditions of said pattern, thereby helping to conceal the deformation defects of the side walls of the tire.

"Lightness" or "luminance" means the parameter which characterizes a surface to reflect light to a greater or lesser extent. Lightness is expressed using a scale that ranges from 0 to 100 according to the L*a*b* colour model established by the CIE (International Commission on Illumination) in 1976. The value 100 represents white or total reflection; the value 0 represents black or total absorption.

The local deformations of the sidewall that are generated during the manufacture of the tire are concealed particularly effectively by the texture, which also provides the tire with a high-end appearance. Moreover, the costs associated with the manufacture of this tire are limited in as much as the texture elements of the patterns are arranged in the form of rows.

Furthermore, with the difference in lightness provided between the rest of the sidewall, which is not textured, and the patterns of the texture, this creates a contrast between the texture and the parts of the sidewall that do not have a texture, thereby making this texture more visible.

Preferably, all or some of the texture elements of the patterns extend linearly in the direction of extension of the rows of said pattern. This makes it possible to further limit the costs associated with the manufacture of the texture. To this end, all or some of the texture elements of each pattern may be the repetition of one and the same base element.

In order to further limit the manufacturing costs of the texture, all or some of the patterns of said texture may be identical and oriented so as to obtain the organized arrangement of the rows of texture elements between a given pattern and the adjacent pattern as indicated above.

In order to reduce the manufacturing costs of the texture, the latter may be produced by a knurling operation carried out during the turning of the mould part. Another possibility is to produce the rows of texture elements by laser machining.

In one embodiment, the value of the angle formed between the direction of extension of the rows of texture elements of said given pattern and between the direction of extension of the rows of texture elements of each pattern adjacent to said given pattern is greater than or equal to 45° in terms of absolute value, for example greater than 60° in terms of absolute value, and preferably equal to 90° in terms of absolute value. The value of said angle may be less than or equal to 135° in terms of absolute value.

The patterns of said texture may have a polygonal, notably square and/or rectangular and/or hexagonal and/or parallelogram-shaped, external shape.

Advantageously, the area of all or some of the patterns of said texture is between 5 mm$^2$ and 3 cm$^2$, and preferably between 10 mm$^2$ and 50 mm$^2$.

All or some of the texture elements of the patterns may be recessed into the surface of said sidewall. Alternatively or in combination, all or some of the texture elements of the patterns may protrude from said sidewall. All or some of the recessed and/or protruding texture elements may have mutually variable shapes and distances. In one particular embodiment, the texture elements may be disposed in a recessed housing formed in said surface of the sidewall.

Preferably, the texture elements of the patterns have identical dimensions in terms of height or depth and width. The texture elements of the patterns of said texture may have a mean width of between 0.02 mm and 0.35 mm, the spacing between said texture elements of one and the same pattern being able to be between 0.05 mm and 0.5 mm.

Preferably, said texture may form overall an annular surface on said sidewall of the tire.

In one embodiment, the tire comprises at least one marking that is entirely or partially surrounded by the texture.

BRIEF DESCRIPTION OF THE DRAWINGS

The present invention will be understood better from reading the detailed description of embodiments that are given by way of entirely non-limiting examples and are illustrated by the appended drawings, in which.

DETAILED DESCRIPTION OF THE DRAWINGS

Figure 1:
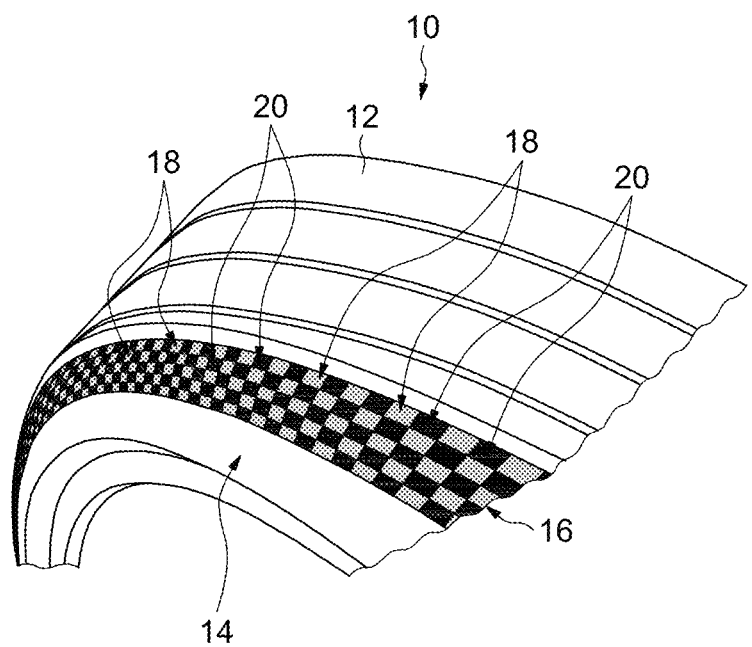
FIG. 1 is a schematic perspective view of a part of a tire that comprises a particular texture formed on a sidewall of the tire in one exemplary embodiment of the invention.

FIG. 1 schematically shows a tire 10 comprising a tread 12 and lateral sidewalls 14 surrounding the tread on either side, only one being visible in the figure. The tread 12 comprises a tread surface intended to come into contact with a road surface during running.

The sidewall 14 comprises a texture 16 that is especially provided to conceal the deformations of this sidewall that are associated with the overlapping of the carcass ply of the tire during manufacture. The texture 16 may extend over all or part of the sidewall 14 and in particular over the part comprising the deformations. The texture 16 may form an overall annular surface in the form of a ring on the sidewall 14. In a variant, the texture 16 may be discontinuous in the circumferential direction.

The texture 16 is made up of a plurality of patterns 18, 20 that are disposed adjacently to one another on the sidewall and which have an identical external shape. In the exemplary embodiment illustrated, the patterns 18, 20 have a square external shape. The texture 16 is thus divided into patterns 18, 20 of equal squares. The texture 16 has in this case a chequerboard shape.

The texture 16 is formed by a plurality of strips that each extend in the circumferential direction and are disposed adjacently in the radial direction. Each strip is made up of an alternation of patterns 18, 20.

Figure 2:
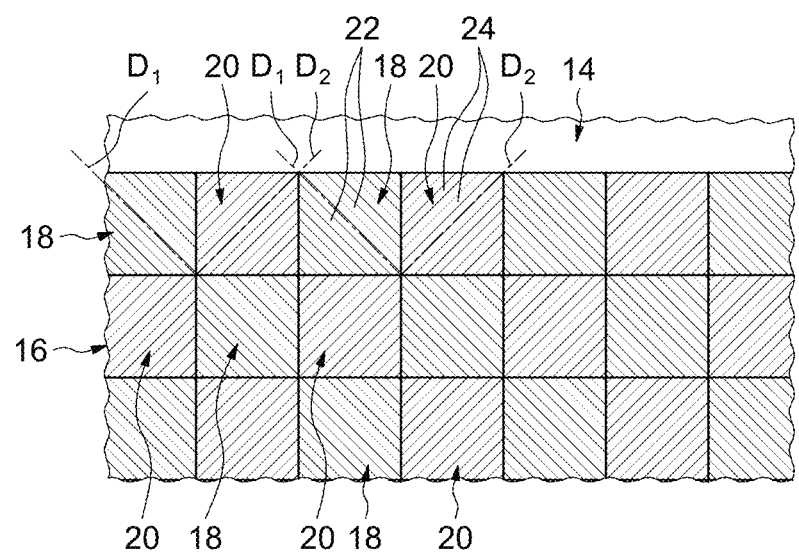
FIG. 2 shows a part of the texture of the sidewall of the tire in FIG. 1, FIGS. 3 to 5 show a part of the texture of the side wall of the tire according to further exemplary embodiments of the invention.

As illustrated more clearly in FIG. 2, each pattern 18 comprises a plurality of mutually parallel striations 22 that are formed in a manner recessed into the surface of the sidewall 14. The striations 22 are thus arranged so as to form a plurality of parallel rows extending in the pattern 18 as seen in a single direction of extension $D_1$. In the exemplary embodiment illustrated, the direction of extension $D_1$ forms an angle with a radial direction perpendicular to the axis of rotation of the tire with a value of 45° in terms of absolute value. In a variant, it is of course possible to provide other values for said angle.

In a similar manner to the patterns 18, each pattern 20 comprises a plurality of mutually parallel striations 24 that extend in one and the same direction of extension $D_2$, which is different from the direction of extension $D_1$. In the exemplary embodiment illustrated, the value of the angle formed between the directions of extension $D_1$ and $D_2$ is equal to 90° in terms of absolute value. Alternatively, it is possible to provide further values of said angle, although it is preferable to remain in a range of between 45° and 90° in terms of absolute value in order to optimize the quality of the visual effect produced by the texture 16.

The striations 22 and 24 extend linearly in the direction of extension $D_1$ or $D_2$, respectively, in the pattern 18 or 20, respectively. The striations 22, 24 are continuous. Alternatively, the striations 22, 24 could be discontinuous.

In order to optimize the concealing properties of the striations 22 and 24, the mean spacing thereof is between 0.05 and 0.5 mm. The spacing may be constant or variable. To this end, the area of each pattern 18, 20 is between 5 mm$^2$ and 3 cm$^2$. The striations 22, 24 have a mean width of between 0.02 mm and 0.35 mm at mid-depth. The striations 22, 24 are distributed in the associated pattern 18, 20 at a density at least equal to 1 striation per mm$^2$, each striation having a mean cross section of between 0.0005 mm$^2$ and 0.6 cm$^2$. The height of the striations is for example between 0.1 mm and 0.6 mm, preferably between 0.2 mm and 0.4 mm.

In the exemplary embodiment illustrated, the patterns 18, 20 of the texture 16 are mutually identical, only the orientation of these patterns being different. In other words, the texture 16 is made up of a repetition of a base pattern, the orientation of which varies. The arrangement of the patterns 18, 20 is organized such that, for a given pattern 18, 20, the rows of striations 22, 24 of each pattern adjacent to this given pattern have a direction of extension $D_1$, $D_2$ that differs in the direction of extension of the rows of the texture elements of said given pattern.

As indicated above, the patterns 18, 20 of the texture have in this case a square external shape. In the exemplary embodiment illustrated, considering a circumferential strip situated in a median zone of the texture 16, the lateral side of a pattern 18 is shared with the lateral side of the pattern 20 that precedes it and the opposite lateral side of the pattern 18 is shared with the lateral side of the pattern 20 that follows it. Similarly, the inner side of a pattern 18 is shared with the outer side of the pattern 20 which is situated below it and the outer side of the pattern 18 is shared with the inner side of the pattern 20 which is situated above it.

Each pattern 18 or 20 of the texture 16 has a lightness referred to as first lightness L*1 or second lightness L*2, respectively. The rest of the side wall 14, which is not textured, has a lightness referred to as third lightness L*3 that is at least 5 units, preferably at least 10 units, greater than the first and second lightnesses L*1, L*2 of the patterns. This creates a contrast between the texture 16 and the rest of the side wall 14, which is not textured, making the texture more visible. The first and second lightnesses L*1 and L*2 of each pattern 18, 20 of the texture 16 may be for example between 5 and 15. The absolute value of the differences in lightnesses L*1 and L*2 between two adjacent patterns 18, 20 is preferably less than or equal to 3.

The appropriate appliance for measuring the lightness is a Konica-Minolta CM 700D spectrocolorimeter. This appliance is suitable for measuring:

the lightness L*1 to L*3 of the areas of the sidewall 14, a component a* that defines a first colour shade between red and green;

a component b* that defines a second colour shade between yellow and blue.

The appliance is positioned on the part of the sidewall 14 of the tire that is to be measured, and then gives the values of the three parameters L*, a* and b*. These measurements are taken using the "SCI" (specular component included) mode, set at an angle of 10° and with a D65 type light setting (setting as defined by the International Commission on Illumination, CIE). By virtue of this appliance, the lightness of the texture 16 of the sidewall is measured, this then being compared with the lightness of the parts of the sidewall 14 that are not textured.

FIG. 2 illustrates a non-limiting example of the orientation of the striations 22, 24 of the patterns of the texture. Alternatively, it is of course possible to provide other orientations for the striations.

Figure 3:
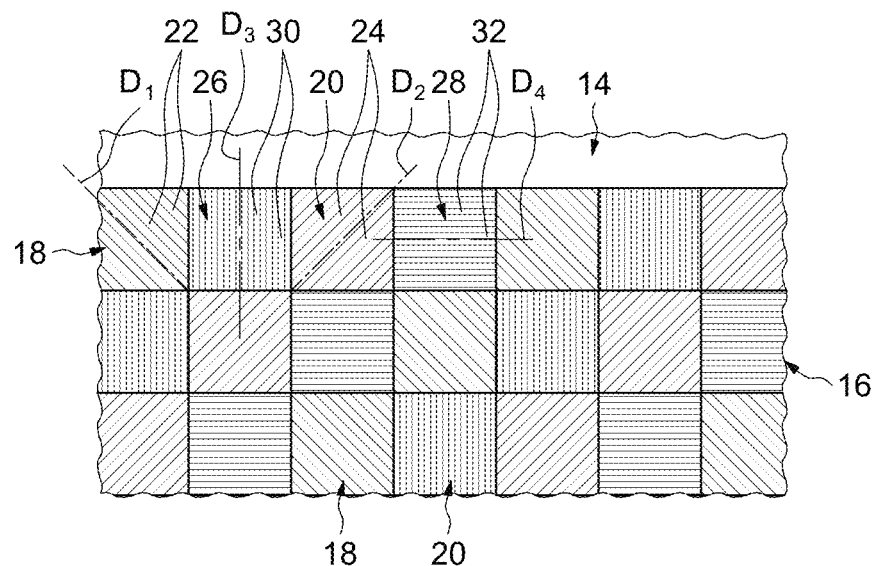

For example, in the embodiment variant illustrated in FIG. 3, in which elements that are identical bear the same references, the texture 16 is made up of the repetition of the first and second patterns 18, 20, and a third and a fourth pattern 26, 28, in which the orientation and the spacing of the striations 30, 32 vary. The striations 30 and 32 are mutually parallel and arranged so as to form a plurality of rows extending in the pattern in question in a direction of extension $D_3$ or $D_4$, respectively, of different extension than the directions of extension $D_1$ and $D_2$. The value of the angle formed between the directions extension $D_1$ and $D_2$ is in this case equal to 90°, the value of the angle formed between the directions of extension $D_3$ and $D_4$ is in this case equal to 90°, and the value of the angle formed between the directions of extension $D_1$, or $D_2$, and $D_3$ or $D_4$, is equal to 45°.

In a variant, it is possible to provide different angle values while maintaining, however, an arrangement of the patterns 18, 20, 26 and 28 such that, for a given pattern, the rows of striations of each pattern adjacent to said given pattern have a different direction of extension from that of the rows of striations of said given pattern.

In a similar manner to the first exemplary embodiment, the parts of the sidewall 14 that are not textured have a lightness that is at least 5 units, preferably at least 10 units, greater than the different lightnesses of the patterns 18, 20, 26 and 28.

In the variant illustrated in FIG. 3, the spacing between the striations 30, 32 of the patterns 26, 28 is reduced compared with the spacing of the striations 22, 24 of the patterns 18, 20. Alternatively, it is possible to provide an identical spacing for the striations 22, 24. Thus, it is possible to provide for the texture 16 to be made up of the repetition of a base pattern in which only the orientation of the rows of striations varies, and not the spacing.

Figure 4:
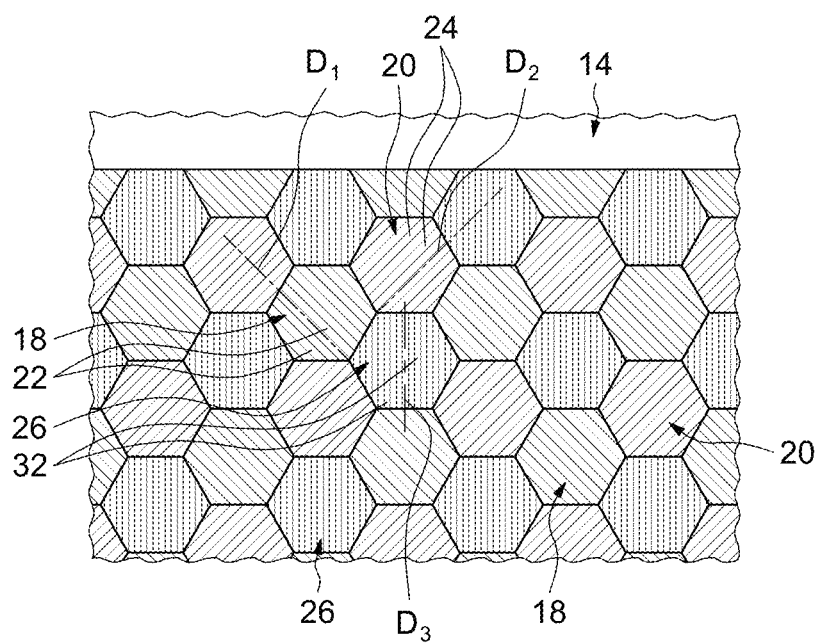
Figure 5:
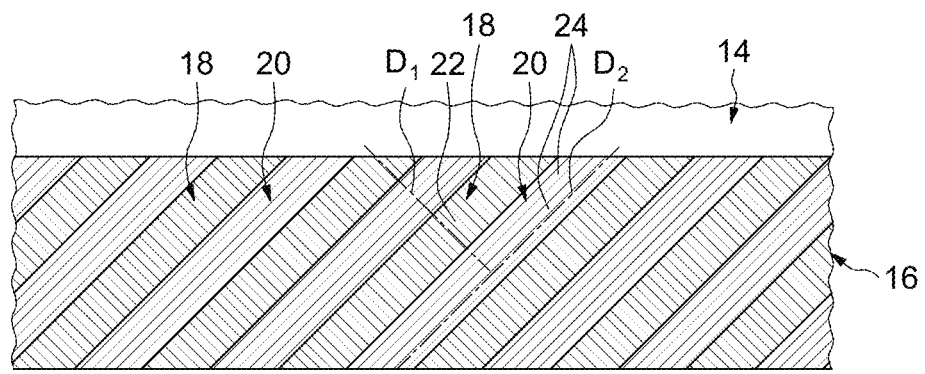

The exemplary embodiment illustrated in FIG. 4, in which elements that are identical bear the same references, differs from the first examples illustrated by way of the external shape of the patterns 18, 20 of the texture, which in this case is hexagonal. In a variant, it is possible to provide further shapes, for example rectangular or parallelogram-shaped, as illustrated in FIG. 5.

Figure 6:
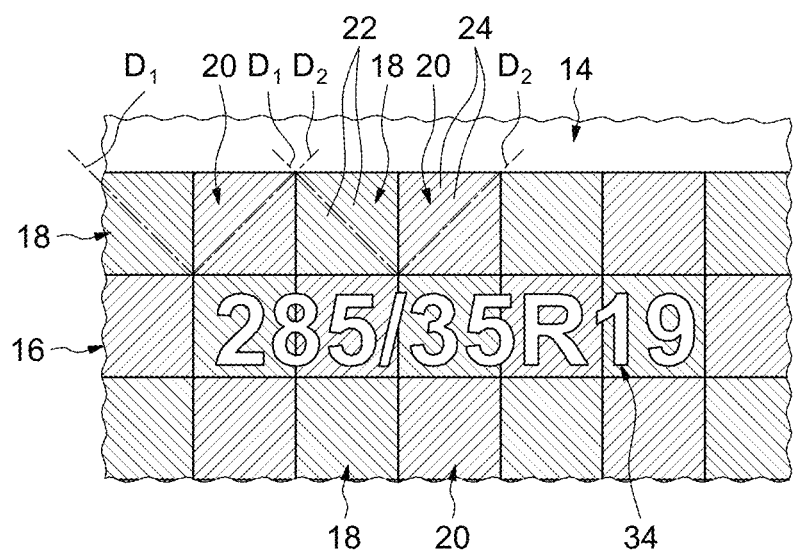
FIG. 6 shows a part of the texture of the sidewall of the tire in FIG. 2, provided with a marking.

According to various embodiment variants, it is also possible to incorporate markings into the textures 16 of the sidewall of the tire. For example, in the exemplary embodiment illustrated in FIG. 6, in which elements that are identical bear the same references, the sidewall of the tire comprises a marking 34 in the area of the texture 16. The marking 34 may be in the form of a smooth surface. The marking 34 in this case comprises technical information of the tire. It is possible to provide any other type of marking, for example legal or distinctive information about the brand of the tire or barcodes for identifying stock, an individual serial number of said tire, etc.

The marking 34 preferably has a lightness greater than that of the patterns 18 and 20, which may be for example between 20 and 30. This difference in lightness makes it possible to render the marking 34 clearly visible. The marking 34 is preferably inset in the texture 16, or flush therewith.

In the exemplary embodiments illustrated, for each pattern of the texture 16 of the sidewall of the tire, the striations are arranged in the form of rows and extend linearly in a continuous manner in the direction of extension of these rows. In a variant, it is possible to provide for all or some of the rows to each be formed by a succession of striations that extend in the direction of extension and are spaced apart from one another in a regular or irregular manner.

The invention has been illustrated on the basis of a texture that extends over all or part of the sidewall and is divided into a plurality of patterns that comprise texture elements made in the form of striations. It would not constitute a departure from the scope of the present invention if the texture elements of the patterns were to comprise other types of recessed texture elements, for example cavities, which may have a circular, cylindrical, polygonal, etc., shape and which are arranged in the form of parallel rows extending in the same direction of extension for a patent in question.

According to other embodiments, it is also possible to provide patterns that comprise texture elements that protrude from the sidewall of the tire, for example blades, strands, protuberances of parallelepipedal, polygonal, etc. section. In this case, the mean height of these protruding elements may be between 0.1 mm and 0.6 mm.

With the texture proposed in the invention, the local deformations of the sidewall that are caused by the shaping of the tire are concealed particularly effectively. Furthermore, the arrangement of the texture elements of the patterns combined with the particular orientation of the patterns with respect to one another makes it possible to obtain, within the very texture, patterns having different lightnesses. The contrast obtained within the texture produces a notable visible effect on the finish of the tire.

Furthermore, the provision of a difference of at least 5 units between the lightness of the parts of the sidewall that are not textured and the lightness of each pattern of the texture makes it possible to create a contrast effect that makes the texture more visible.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire comprised of rubbery material, comprising a tread and two sidewalls delimiting said tread, at least one of the sidewalls comprising at least one texture that contrasts with the rest of said sidewall,
   wherein said texture is divided into a plurality of patterns of identical polygonal external shape, the polygonal patterns being contiguous patterns that comprises at least one common edge,
   wherein all of the polygonal patterns comprise a plurality of texture elements arranged to form in the polygonal pattern a plurality of rows that extend in one and the same direction of extension,
   wherein, for a given polygonal pattern of said texture, the rows of texture elements extend into a whole of the given polygonal pattern,
   wherein the texture elements of the polygonal patterns have identical dimensions into the whole texture,
   wherein, for a given polygonal pattern of said texture, the rows of texture elements in each polygonal pattern contiguous to said given pattern have a direction of extension different from the direction of extension of the rows of texture elements of said given pattern,
   wherein the lightness of said rest of said sidewall, which is not textured, is at least 5 units greater than the lightnesses of the patterns of said texture, and
   wherein all or some of the texture elements of the patterns protrude from said sidewall.

2. The tire according to claim 1, wherein all or some of the texture elements of each pattern extend linearly in said pattern in the direction of extension of the rows of said pattern.

3. The tire according to claim 1, wherein all or some of the texture elements of each pattern are the repetition of one and the same base element.

4. The tire according to claim 1, wherein the patterns of said texture are mutually identical.

5. The tire according to claim 1, wherein the value of the angle formed between the direction of extension of the rows of texture elements of said given pattern and between the direction of extension of the rows of texture elements of each pattern adjacent to said given pattern is greater than or equal to 45° in terms of absolute value.

6. The tire according to claim 5, wherein the value of said angle is greater than 60° in terms of absolute value.

7. The tire according to claim 5, wherein the value of said angle is less than or equal to 135° in terms of absolute value.

8. The tire according to claim 5, wherein the value of said angle is equal to 90° in terms of absolute value.

9. The tire according to claim 1, wherein the patterns of said texture have the polygonal, notably square and/or rectangular and/or hexagonal and/or parallelogram-shaped, external shape.

10. The tire according to claim 1, wherein the area of all or some of the patterns of said texture is between 5 mm$^2$ and 3 cm$^2$.

11. The tire according to claim 1, wherein all or some of the texture elements of the patterns are recessed into said sidewall.

12. The tire according to claim 1, wherein the texture elements of the patterns have identical dimensions.

13. The tire according to claim 1, wherein the texture elements of the patterns of said texture have a mean width of between 0.02 mm and 0.35 mm, the spacing between said texture elements of one and the same pattern being between 0.05 mm and 0.5 mm.

14. The tire according to claim 1, wherein said texture forms overall an annular surface on said sidewall of the tire.

15. Tire according to claim 1, comprising at least one marking that is entirely or partially surrounded by the texture.

16. The tire according to claim 1, wherein the area of all or some of the patterns of said texture is between 10 mm$^2$ and 50 mm$^2$.

17. A tire comprised of rubbery material, comprising:
   a tread; and
   two sidewalls delimiting said tread, at least one of the sidewalls comprising at least one texture that contrasts with the rest of the sidewall,
      wherein the texture is divided into a plurality of patterns of identical polygonal external shape,
      wherein the texture is formed by a plurality of strips that each extend in a circumferential direction and are disposed adjacently in a radial direction,
      wherein, considering a circumferential strip situated in a median zone of the texture, a lateral side of a given pattern is shared with a lateral side of a pattern that precedes it and an opposite lateral side of the given pattern is shared with a lateral side of the pattern that follows it, and an inner side of the given pattern is shared with an outer side of the pattern situated below it and an outer side of the given pattern is shared with an inner side of the pattern which is situated above it, wherein all of the polygonal patterns comprise a plurality of texture elements arranged to form in the polygonal pattern a plurality of rows that extend in one and the same direction of extension, wherein, for a given polygonal pattern of the texture, the rows of texture elements in each polygonal pattern with a side shared with said given pattern have a direction of extension different from the direction of extension of the rows of texture elements of the given pattern, wherein the texture elements of the polygonal patterns have identical dimensions into the whole texture, wherein the lightness of said rest of said sidewall, which is not textured, is at least 5 units greater than the lightnesses of the patterns of said texture, and wherein the texture elements of the patterns of said texture have a mean width of between 0.02 mm and 0.35 mm, the spacing between said texture elements of one and the same pattern being between 0.05 mm and 0.5 mm.

18. A tire comprised of rubbery material, comprising a tread and two sidewalls delimiting said tread, at least one of the sidewalls comprising at least one texture that contrasts with the rest of said sidewall, wherein said texture is divided into a plurality of patterns of identical polygonal external shape, the polygonal patterns being contiguous patterns that comprises at least one common edge, wherein all of the polygonal patterns comprise a plurality of texture elements arranged so as to form in the polygonal pattern a plurality of rows that extend in one and the same direction of extension, wherein, for a given polygonal pattern of said texture, the rows of texture elements extend into the whole said given pattern, wherein the texture elements of the polygonal patterns have identical dimensions into the whole texture, wherein, for a given polygonal pattern of said texture, the rows of texture elements in each polygonal pattern contiguous to said given pattern have a direction of extension different from the direction of extension of the rows of texture elements of said given pattern, wherein the lightness of said rest of said sidewall, which is not textured, is at least 5 units greater than the lightnesses of the patterns of said texture and wherein the texture elements of the patterns of said texture have a mean width of between 0.02 mm and 0.35 mm, the spacing between said texture elements of one and the same pattern being between 0.05 mm and 0.5 mm.

* * * * *